(12) United States Patent
Fujiwara (10) Patent No.: US 7,813,874 B2
(45) Date of Patent: Oct. 12, 2010

(54) ON-VEHICLE NAVIGATION SYSTEM, ROUTE GUIDE METHOD, AND COMPUTER-READABLE RECORDING MEDIUM

(75) Inventor: Manabu Fujiwara, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 766 days.

(21) Appl. No.: 11/688,542

(22) Filed: Mar. 20, 2007

(65) Prior Publication Data
US 2007/0225910 A1   Sep. 27, 2007

(30) Foreign Application Priority Data
Mar. 22, 2006   (JP)   ............... 2006-078463

(51) Int. Cl.
*G01C 21/00*   (2006.01)
(52) U.S. Cl. ............... 701/211; 701/200; 340/995.23
(58) Field of Classification Search ......... 701/200–202, 701/208, 211, 25, 28, 206, 213–215; 340/995.1, 340/995.23, 995.14, 988
See application file for complete search history.

(56) References Cited

U.S. PATENT DOCUMENTS 5,537,324 A * 7/1996 Nimura et al. ............ 701/208
5,941,930 A * 8/1999 Morimoto et al. ........... 701/201
6,424,909 B2   7/2002 Kusano et al.

FOREIGN PATENT DOCUMENTS

| JP | 10-082652 | 3/1998 |
|----|-----------|--------|
| JP | 2001-331606 | 11/2001 |

* cited by examiner

*Primary Examiner*—Yonel Beaulieu
(74) *Attorney, Agent, or Firm*—Brinks Hofer Gilson & Lione (57) ABSTRACT

The invention provides an on-vehicle navigation system, route guide method, and computer-readable recording medium capable of setting an optimum guide point corresponding to proposed actions set as destinations or way points, and performing route guidance based on the setting. The on-vehicle navigation system includes a function of searching for a guide route leading to a set destination or the like and displaying the searched guide route on a screen of a display to guide the vehicle. The route guide method includes: registering information organized in a list form in a storage means, in which each of the places prepared as candidates for destinations or the like is associated in advance with proposed actions at the place; when a destination or the like is selected, extracting the information on the proposed actions at the place to display it in a list form on the screen of the display; when any of the proposed actions is selected, referring to a map database to search for a guide point corresponding to the selected proposed action; and setting the searched guide point as the destination or the like.

17 Claims, 5 Drawing Sheets

FIG. 2

| SEARCH PLACE | PROPOSED ACTION AT THE PLACE | ROUTE GUIDE POINT |
|---|---|---|
| OO IC | ENTER EXPRESSWAY | GUIDE TO ENTER EXPRESSWAY FROM SPECIFIED IC |
| | EXIT EXPRESSWAY | GUIDE TO EXIT EXPRESSWAY FROM SPECIFIED IC |
| | PASS | GUIDE TO PASS SPECIFIED IC (KEEP RUNNING ON EXPRESSWAY) PASS EXPRESSWAY LINKED WITH SPECIFIED IC |
| | DROP IN | GUIDE TO PARKING IN IC |
| OO EXPRESS BUS TERMINAL | USE EXPRESS BUS | GUIDE TO PARKING NEAR BUS STOP |
| | PICKUP | GUIDE TO OPEN ROAD ENTRANCE TO BUS TERMINAL |
| | SEE OFF | GUIDE TO PARKING NEAR BUS STOP |
| ACCOMMODATIONS OO HOTEL OO INN OO SPA | USE | GUIDE TO PARKING |
| | STAY | GUIDE TO ENTRANCE |
| | SEE OFF | GUIDE TO EXIT (ENTRANCE) |
| | GO TO MEET | GUIDE TO PARKING |
| | TAKE MEAL | GUIDE TO PARKING |
| | GO SHOPPING | GUIDE TO PARKING |
| | MAKE DAY TRIP TO TAKE HOT SPRING | GUIDE TO PARKING |
| OO SHOPPING MALL | SHOPPING (TENANT SPECIFIED) | GUIDE TO PARKING NEAREST TENANT |
| | SHOPPING (TENANT NOT SPECIFIED) | GUIDE TO PARKING |
| OO SCHOOL | PICKUP | |
| | ATTEND SCHOOL | PRIMARY SCHOOL, ETC. COLLEGE, ETC. TO BE ABLE TO ATTEND BY CAR |
| OO HOME CENTER | PURCHASE KEROSENE | GUIDE TO PARKING NEAREST KEROSENE SHOP |
| | ORDINARY SHOPPING | GUIDE TO ORDINARY PARKING |
| OO GAS STATION | SUPPLY OIL | GUIDE TO OIL-SUPPLYING SPACE (GUIDE TO PLACE CORRESPONDING TO FUEL TYPE AMONG HIGH-OCTANE GASOLINE, REGULAR GASOLINE AND LIGHT OIL) |
| | PURCHASE KEROSENE | GUIDE TO KEROSENE SPACE |
| | WASH CAR | GUIDE TO CAR WASH SPACE |
| | TAKE REST | GUIDE TO SPACE OUT OF THE WAY OF OBSTACLE TO TRAFFIC |

PROPOSED ACTION DATABASE

FIG. 3

| SEARCH PLACE | PROPOSED ACTION AT THE PLACE | ROUTE GUIDE POINT |
|---|---|---|
| ○○ STATION | PICUP | GUIDE TO ROTARY AT STATION |
| | TAKE TRAIN (SHORT DISTANCE) | GUIDE TO PARKING AROUND STATION |
| | TAKE TRAIN (LONG DISTANCE) | GUIDE TO PARK-AND-RIDE LOT |
| | GO SHOPPING | GUIDE TO PARKING AROUND STATION |
| ○○ SA/PA | GO TO REST ROOM | GUIDE TO PARKING NEAR REST ROOM |
| | TAKE MEAL | GUIDE TO PARKING NEAR RESTAURANT |
| | TAKE REST | GUIDE TO PARKING |
| | SUPPLY OIL | GUIDE TO GAS STAION IN SA |
| POPULAR TOURIST SITE ○○ | TOUR | GUIDE TO PARKING |
| | PASS (TOUR KEEPING ON DRIVING) | SET SURROUNDING ROADS TO TRANSIT POINT |
| ○○ AIR PORT | RIDE IN AIRPLANE | GUIDE TO PARKING |
| | GO TO MEET | GUIDE TO ROTARY NEAR ARRIVAL LOUNGE |
| | SEE OFF | GUIDE TO ROTARY NEAR DEPARTURE LOUNGE |
| | SHOPPING (TERMINAL BUILDING) | GUIDE TO PARKING |
| ○○ DEPARTMENT STORE | SHOPPING (TENANT SPECIFIED) | GUIDE TO PARKING NEAREST TENANT (WARNING IN CASE DIFFERENCE BETWEEN SHOP HOUR AND OPERATING HOUR OF PARKING EXISTS) |
| | SHOPPING (TENANT NOT SPECIFIED) | GUIDE TO LINKED PARKING |
| | GATEWAY | GUIDE TO PARKING PASSING GATEWAY (FATHERLY FUNCTION) |
| | BUSINESS | GUIDE TO BACK ENTRANCE |
| | PICKUP | GUIDE TO FRONT ENTRANCE |

PROPOSED ACTION DATABASE

ON-VEHICLE NAVIGATION SYSTEM, ROUTE GUIDE METHOD, AND COMPUTER-READABLE RECORDING MEDIUM

RELATED APPLICATIONS

The present application claims priority to Japanese Patent Application Number 2006-078463, filed Mar. 22, 2006, the entirety of which is hereby incorporated by reference.

BACKGROUND OF THE INVENTION

1. Field of the Invention

The present invention relates to an on-vehicle navigation system, specifically to an on-vehicle navigation system, a route guide method, and a computer-readable recording medium capable of setting a detailed location regarding a destination or a way point, in correspondence with a specific proposed action at a destination or a way point, when the destination or the like is set.

2. Description of the Related Art

A typical on-vehicle navigation system generally includes a control unit such as a CPU that controls the entire process of navigation, a storage unit such as a CD-ROM or DVD-ROM to store map data, a display unit such as an LCD monitor, a GPS receiver that detects the current position of a vehicle, a gyroscope and speed sensor that detect the travel azimuth and travel speed of the vehicle, and so forth. Through the control unit, the navigation system reads out the map data including the current position of the vehicle from the storage unit, plots on the screen of the display unit a map image of an area that surrounds the current position of the vehicle based on the map data, superimposes a vehicle position mark that indicates the current position of the vehicle on the screen, scrolls the map image so as to follow the movement of the vehicle, and moves the vehicle position mark while immobilizing the map image on the screen, whereby a user can perceive at a glance where the vehicle travels.

The on-vehicle navigation system is also equipped with a guide function (route guide function) that helps the user to easily reach a destination without taking a wrong road. According to this route guide function, the control unit searches an optimum route from a starting point (typically, the position of the vehicle) leading to a destination using the map data by performing a simulation by means of the breadth-first search method and/or the Dijkstra method and the map data, stores the searched route as a guide route, displays, while traveling, the guide route on the map image in a manner different from other roads (for example, by changing the color or thickening the line), and when the vehicle enters an area within a predetermined distance of an approaching intersection on the guide route, displays a guide map of the intersection (enlarged map of the intersection, an arrow indicating the travel direction at the intersection, a distance to the intersection, the name of the intersection, etc.), so that the user can perceive which road to travel, or which direction to take at the intersection.

To perform the route search function, the user sets in advance a destination, a way point(s) on the way to the destination, and several conditions (whether to give preference to a toll road or to give preference to an open road, whether to give preference to reducing the travel distance or to give preference to reducing the travel time, etc.) at the same time. On the basis of the data thus set, the navigation system searches plural guide routes to the destination or plural guide routes to the way point, and provides route guidance to follow one route that the user selects among them.

As a technique related to the above conventional technique, there is one disclosed in Japanese Patent Laid-Open No. 2001-331606, for example, wherein, when a user inputs an arrival and departure place of a vehicle, such as an airport, as a destination and selects a passenger transportation company (airline company), the navigation system notifies the user of a terminal corresponding to the passenger transportation company (the airline company). Further, in a technique disclosed in Japanese Patent Laid-Open No. H10-82652, the navigation system searches for a destination on the basis of the proposed action or conditions for such a proposed action based on the operator's input.

SUMMARY OF THE INVENTION

The above conventional on-vehicle navigation systems are made to be able to select a guide route by setting a destination or a way point. However, there can be a case that the guide point at the destination or the way point can be different depending on the proposed action or purpose of the user at the destination or the way point, that is, the proposed action for which the user wishes to visit the place.

Suppose the user goes shopping to a shopping mall by car, for example. The user sets the shopping mall as a destination in the navigation system. However, a shopping mall is generally a large establishment. Therefore, in this case the conventional technique provides a guide route to a location that represents the place set as the destination (for example, the front entrance of the shopping mall). In case the user wishes to shop at a specific store in the shopping mall, if the desired store is located near the front entrance of the shopping mall, there will not be any inconvenience. However, if the desired store is located at a different place (the side opposite the front entrance, for example), the user will be guided to the front entrance, and thereafter the user will need to proceed thereafter to a place near the desired store, which is inconvenient.

If the guide point at the place is different depending on the proposed action at the destination, the conventional navigation system provides the guide route to the destination initially set, displays the map image of the destination and the surrounding area thereof on the screen of the display unit, makes the user set the cursor to a desired location on the map, for example, and sets the desired location as the guide point (new destination). The conventional navigation system requires such a setting operation for modifying the guide point, and this setting is rather difficult for ordinary users.

The present invention has been made in view of the above problem of the conventional technique, and provides an on-vehicle navigation system capable of setting an optimum guide point at the place corresponding to a proposed action at the place set as a destination or a way point and providing a guide route based on this setting, a route guide method, and a computer-readable recording medium.

According to one embodiment of the invention, the on-vehicle navigation system includes: a display means that provides guidance information through a screen, an input means that inputs information that a user specifies, a first storage means that stores map data, a second storage means that stores proposed actions information in a list form, in which proposed action information includes pre-defined items corresponding to each of the places prepared as candidates for destinations or way points, and a control means connected operationally with the display means, input means, first storage means, and second storage means. When a destination or a way point is selected through the input means, the control means extracts the proposed action information corresponding to the selected place from the second storage means and displays it on the screen of the display means. Then, when any proposed action is selected from the displayed list, the control means refers to the map data, searches a guide point corresponding to the selected proposed action, and sets the searched guide point as the destination or the way point.

According to the above on-vehicle navigation system of the invention, the storage means stores the information (proposed action list), which is organized in a list form, in which the proposed actions at the place are associated in advance with each of the places prepared as candidates for destinations and way points. When a user selects a destination or a way point, the control means displays the "proposed action list" on the screen of the display means; and when the user selects any of the proposed actions from the list, the control means searches, referring to the map data, for a guide point (detailed location at the place) corresponding to the selected proposed action, and sets the guide point as the destination/way point.

Thus, in the setting of a destination or a way point, the navigation system provides the user through the screen with the information wherein the proposed actions at the place are organized in a list, and modifies the guide point at the place (destination or way point) in correspondence with the proposed action that the user selects. Thereby, the navigation system is capable of setting an optimum guide point corresponding to the proposed action of the user and providing route guidance based on the setting.

According to another embodiment of the invention, the invention provides the route guide method in an on-vehicle navigation system provided with a function of searching for a guide route leading to a set destination or a set way point and displaying the searched guide route on a screen of a display means to guide the vehicle. The route guide method comprises: registering information organized in a list form in a storage means, in which each of the places prepared as candidates for destinations or way points is associated in advance with proposed actions at the place; when a destination or a way point is selected on the basis of a user specification, extracting the proposed action purpose information for the place from the storage means to display it on the screen of the display means; when any of the proposed actions is selected from the list, referring to a map database to search for a guide point corresponding to the selected proposed action; and setting the searched guide point as the destination or the way point.

According to another embodiment of the invention, the invention provides a computer-readable recording medium, which is used with an on-vehicle navigation system including a computer that controls a function of searching for a guide route leading to a set destination or a set way point and displaying the searched guide route on a screen of a display means to guide the vehicle. The computer-readable recording medium contains programs that control the computer to execute the following procedures of: when a destination or a way point is selected on the basis of a user specification, extracting proposed action information from a storage means registered in a list form, in which proposed action information is predefined for each of the places prepared as candidates for destinations or way points, the proposed action information at the place being displayed in list form on the screen of the display means; when any of the proposed actions is selected from the displayed list, referring to a map database to search for a guide point corresponding to the selected proposed action; and setting the searched guide point as the destination or the way point.

Other construction features of the on-vehicle navigation system of the present invention and concrete operational modes based thereon will be described in detail with reference to the embodiments described later.

DESCRIPTION OF THE PREFERRED EMBODIMENTS

Embodiments of the present invention will be described with reference to the appended drawings.

Figure 1:
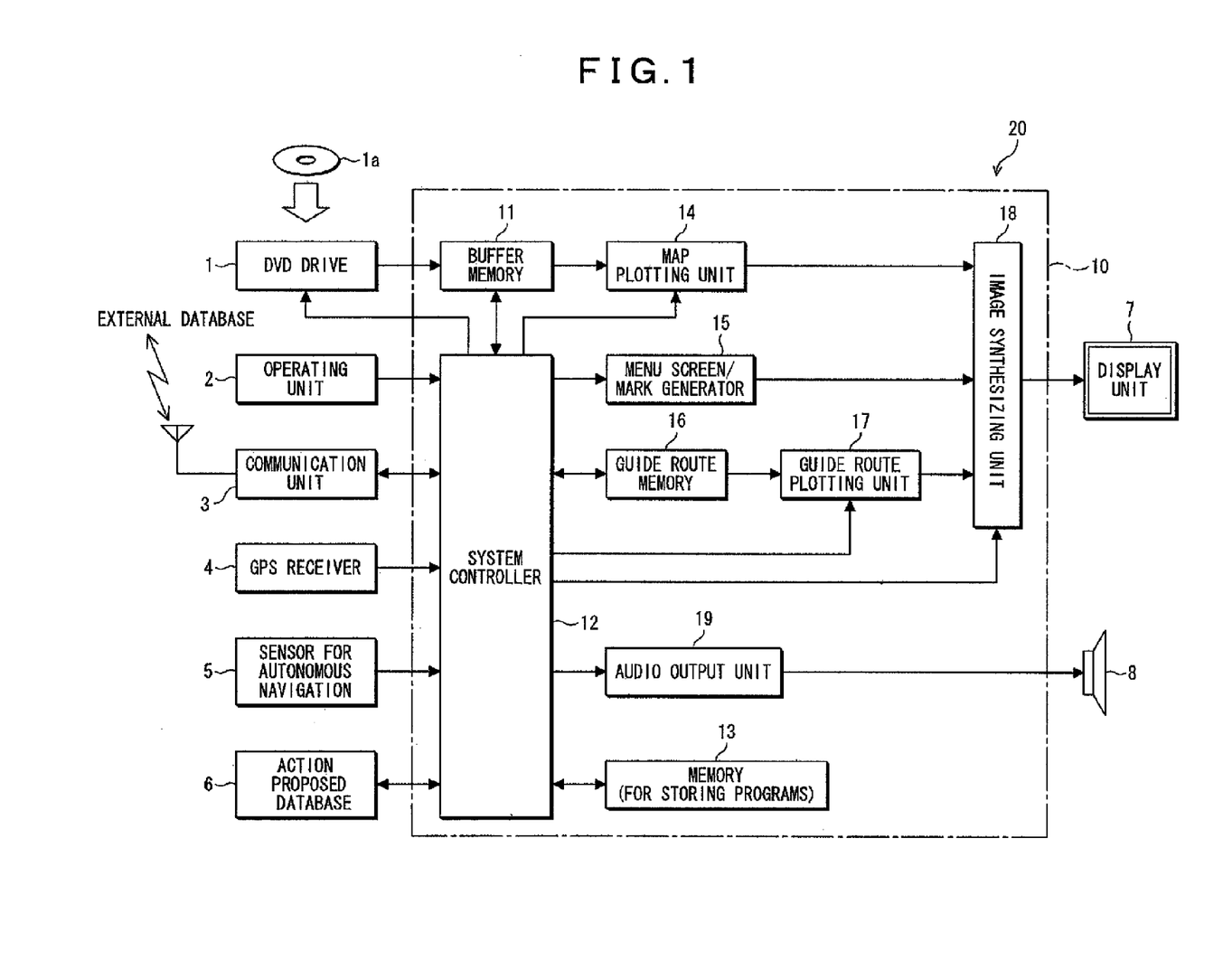
FIG. 1 is a block diagram representing the construction of an on-vehicle navigation system according to one embodiment of the present invention.

FIG. 1 shows the construction of an on-vehicle navigation system according to one embodiment of the invention by means of a block diagram. In an on-vehicle navigation system 20 of this embodiment, the symbol 1 represents a DVD drive, and a DVD (DVD-ROM) 1a driven by this DVD drive 1 stores map data partitioned into the longitude breadth and latitude breadth of an appropriate size in correspondence with each scale level (1/12500, 1/25000, 1/50000, etc.). The map data includes data (various information on locations, addresses, phone numbers, genres, etc.) related to various establishments (convenience stores, supermarkets, discount shops, department stores, airports, gas stations, home centers, etc.) existing on the map, and in addition the map data includes the data of road units required for various processes such as the route search and map matching processes and the like, and the data of intersection units that represent the details of intersections. The road unit includes nodes (points expressed by longitude and latitude) corresponding to the points where plural roads intersect, such as intersections and branches, and links corresponding to the roads and lanes and the like that connect the nodes. This embodiment uses a DVD-ROM as a medium that stores the map data, however this may be replaced by a CD-ROM, HDD, or other recording medium.

The symbol 2 represents an operating unit that operates the main body of the navigation system described later, which has the form of a remote control transmitter, for example. Such a remote control transmitter is equipped with operating buttons and a joy stick (not illustrated) that select various menus and various items on the screen of the display unit described later, and execute the selected menus, etc. The symbol 3 represents a communication unit such as a mobile phone or an on-vehicle phone, which communicates with an external information center that retains a map database (DB). The symbol 4 represents a GPS receiver that receives GPS signals transmitted from GPS satellites and detects the longitude and latitude of a current position of the vehicle. The symbol 5 represents a sensor for autonomous navigation equipped with an angle sensor such as a gyroscope that detects the travel azimuth of the vehicle and a distance sensor that generates pulses at every constant travel distance.

The symbol 6 represents a proposed action database that constitutes a feature of this invention. The proposed action database 6 contains information (proposed action list), in which respective places in each of plural establishments may be associated in a list form with proposed actions at each of the establishments, which are appropriately extracted in advance as candidates (places to be searched) for destinations or way points among the establishments contained in the map data stored in the map database (DVD-ROM 1a). If a destination or a way point is selected, when any of the "proposed actions" registered in the proposed actions database 6 is selected, a system controller 12 searches for a guide point (detailed location in the destination/way point) corresponding to the selected proposed action, which will be described later. Then, the system controller 12 sets the guided point thus searched as the destination/way point.

Figure 2:
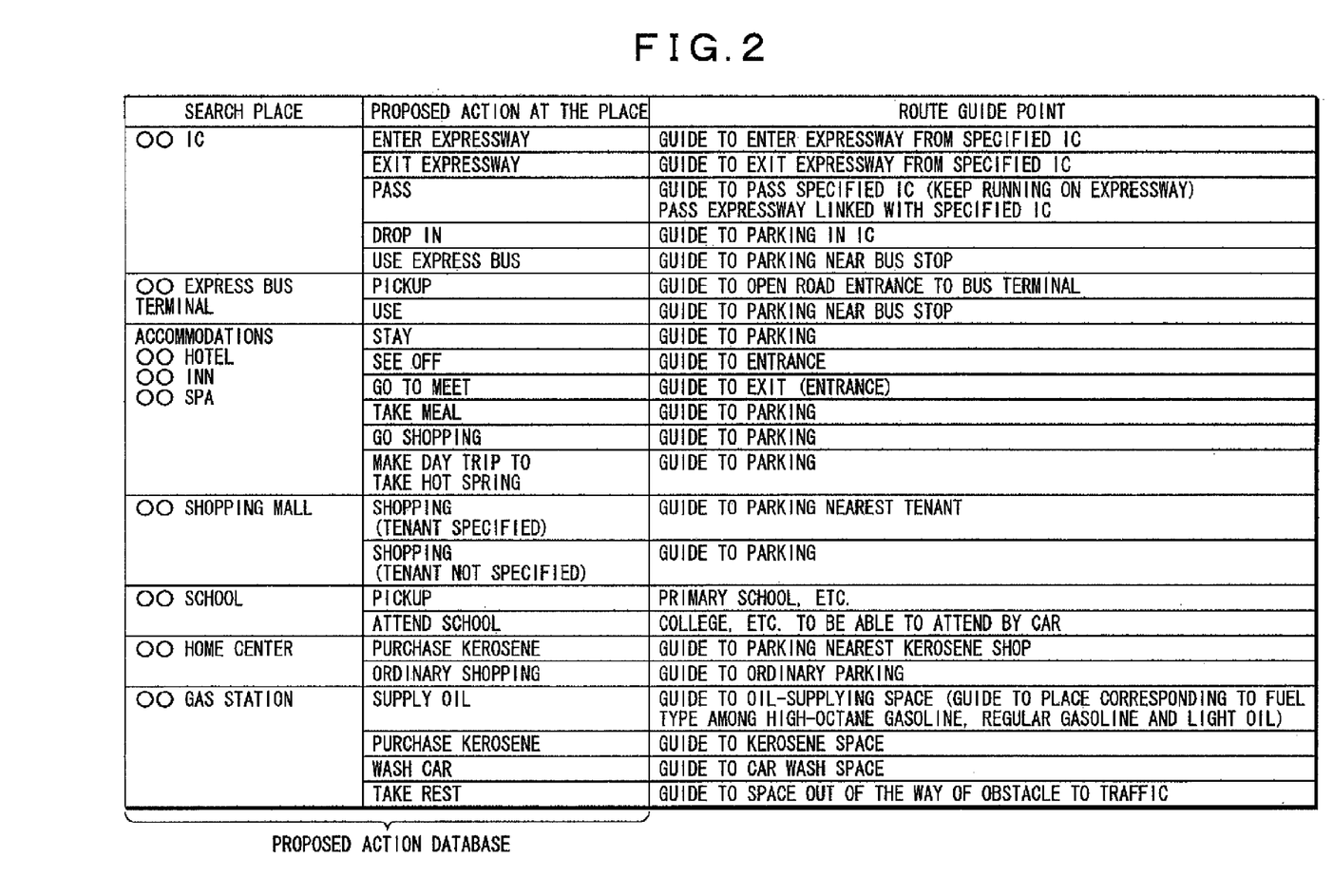
FIG. 2 is a chart showing one example of the proposed action information recorded in the proposed action database in FIG. 1.
Figure 3:
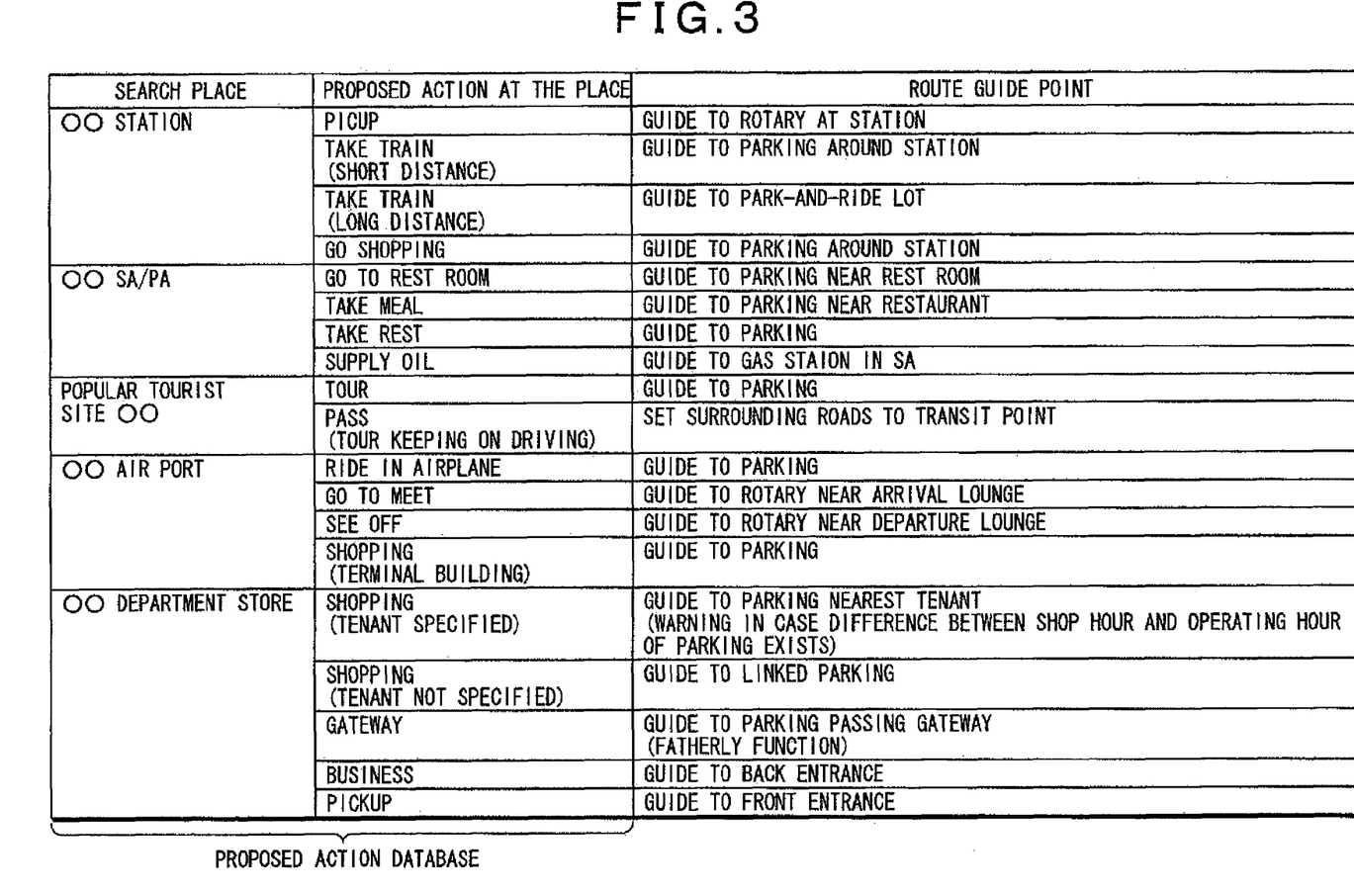
FIG. 3 is a chart showing another example of the proposed action information recorded in the proposed action database in FIG. 1.

FIG. 2 and FIG. 3 show examples of the information registered in this proposed action database 6. As shown in each chart, plural "proposed actions" are registered by each search place to be associated in advance with each of the search places that are candidates for the destinations/way points. If "○○ IC (interchange)" is selected as the search place, as the proposed actions at that place are provided five options: "enter expressway", "exit expressway", "pass", "drop in", and "use a bus". In FIG. 2 and FIG. 3, the "route guide point" given on the right side of each chart relates the contents of the route guidance when each of the proposed actions is selected.

Referring to FIG. 1 again, the symbol 7 represents a display unit of an LCD and the like. On the basis of the control from the main body of the navigation system, which will be described later, the display unit 7 displays on the screen the guide information on navigation such as a map of an area surrounding a current position of the vehicle, a guide route from a starting point to a destination, the current position of the vehicle (vehicle position mark), and so forth. Further, the display unit 7 displays on the screen the guide information relating to the setting of a guide point corresponding to a proposed action at a destination and/or way point. The navigation system 20 performs this setting, as described later. The symbol 8 represents a speaker, which delivers an audio output of the guide information for the above navigation and the guide information on setting a guide point corresponding to a proposed action at a destination and/or way point.

The symbol 10 represents the main body of the navigation system 20. In the main body 10, the symbol 11 represents a buffer memory that temporarily stores the map data read out from the DVD 1a through the DVD drive 1, 12 represents a system controller configured with a microcomputer and so forth, 13 represents a memory of a ROM or the like that stores various programs specifying various processes executed by the system controller 12, such as a program for guide route search, a program for setting a guide point corresponding to a proposed action at a destination and/or a way point, and so forth. The system controller 12 executes the following various navigation processes, such as detecting a current position of the vehicle on the basis of the programs stored in the memory 13 and signals received from the GPS receiver 4, calculating a travel speed of the vehicle on the basis of the signals from the sensor for autonomous navigation 5, reading the map data to be displayed from the DVD 1a to the buffer memory 11 by controlling the DVD drive 1, searching for a guide route from a starting point (current position of the vehicle) to a destination with a set search condition using the map data, and so forth. Further, the system controller 12 controls the processes relating to the setting of a guide point corresponding to a proposed action at a destination and/or a way point. This setting is performed by the navigation system 20, which will be described later.

The symbol 14 represents a map plotting unit that executes the process of plotting map images with the map data read into the buffer memory 11, 15 represents a menu screen and/or mark generator that generates various menu screens (operating screens) and various marks such as a position mark of the vehicle and a cursor, etc., corresponding to the operating conditions, and 16 represents a guide route memory that stores the data relating to the guide route. The guide route memory 16 stores the data relating to all the nodes (coordinates of the points expressed by longitude and latitude) from the starting points to the destinations of the guide routes searched by the system controller 12. The symbol 17 represents a guide route plotting unit, which reads data of a guide route from the guide route memory 16 under the control of the system controller 12, and plots the guide route in a display manner different from that of the other roads (changing the color, thickening the line, or the like).

The symbol 18 represents an image synthesizing unit. Under the control of the system controller 12, the image synthesizing unit 18 superimposes the guide route plotted by the guide route plotting unit 17 and the various menu screens and marks generated by the menu screen and/or mark generator 15 on the map image plotted by the map plotting unit 14, and displays the superimposed map image on the screen of the display unit 7. The image synthesizing unit 18 further displays on the screen of the display unit 7 the guide information relating to the setting of a guide point corresponding to a proposed action at a destination and/or a way point. This setting is performed by the navigation unit 20, as described later. The symbol 19 represents an audio output unit, and the audio output unit 19 sends to the speaker 8 audio signals (guide information on navigation and guide information on setting the guide point corresponding to a proposed action at a destination and/or a way point) on the basis of the control from the system controller 12.

In the on-vehicle navigation system 20 of the above construction, the DVD-ROM 1a corresponds to the "first storage means", the operating unit 2 corresponds to the "input means", the communication unit 3 corresponds to the "communication means", the proposed action database 6 corresponds to the "second storage means", the display unit 7 corresponds to the "display means", the speaker 8 corresponds to the "audio output means", the system controller 12 corresponds to the "control means", and the memory 13 corresponds to the "recording medium".

Figure 4:
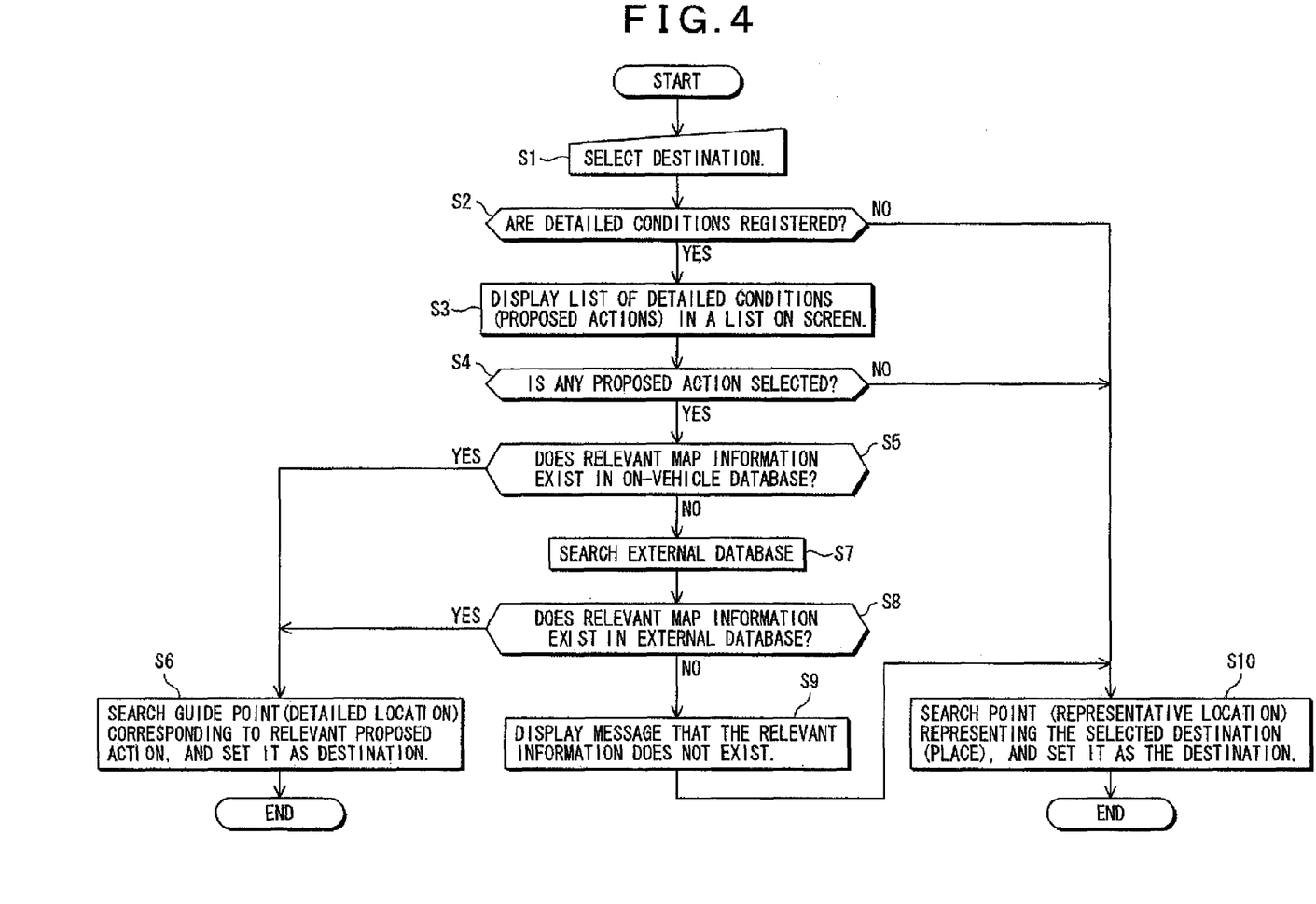
FIG. 4 is a flow chart showing one example of the process relating to the setting of a guide point corresponding to the proposed action at a destination, which is performed in the on-vehicle navigation system as shown in FIG. 1.

The process of setting the guide point corresponding to a proposed action at a destination, which is performed by the on-vehicle navigation system 20 of this embodiment, will be described with reference to FIG. 4 that shows one example of the process flow. The screen displays shown in FIG. 5 are also referred to in the description of this process flow. Meanwhile, the contents of the process flow shown in FIG. 4 are stored as programs in the memory 13.

The first step S1 selects the destination to which a user desires to travel. If the user operates the remote control transmitter (operating unit 2), and points to "menu", for example, the system controller 12 displays the menu screen on the display unit 7 through the image synthesizing unit 18. By following the instructions of this menu screen and appropriately entering a keyword related to an establishment name, a genre, or the like, the user can select a desired destination. The "destination" here not only refers to a search place shown in FIG. 2 or FIG. 3 (registered in the action database 6 as candidates for destinations and/or way points), but also refers to other establishments (those not registered in the proposed action database 6), such as a private residence, a business address, and so forth.

The next step S2 collates the information on the selected destination with the information (proposed action list) registered in the proposed action database 6 by means of the system controller 12, and judges whether detailed conditions (proposed actions) corresponding to the destination are registered (YES) or not (NO). If the judgment is YES, the process goes to step S3; and if NO, it goes to step S10. In the case of NO in the judgment, the user may have selected the "private residence" as the destination, for example.

Figure 5A:
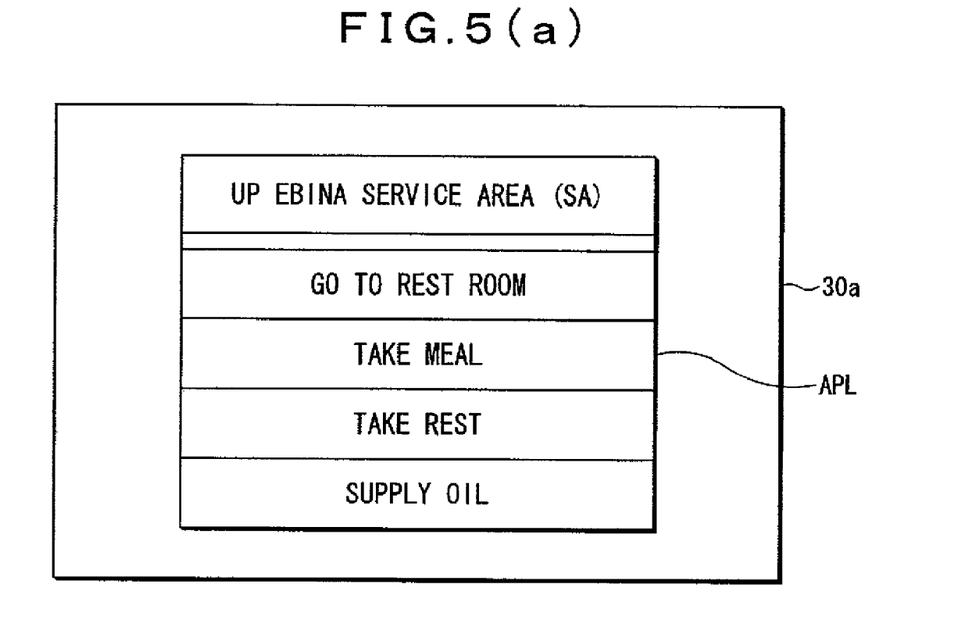
FIGS. 5(a) and 5(b) illustrate examples of screen displays, which further explain the process flow in FIG. 4.

In case the selected destination (place) is registered in the proposed action database 6, step S3 extracts the detailed condition (proposed action) from the proposed action database 6 by means of the system controller 12, and displays the extracted information in a list form on the screen of the display unit 7 through the image synthesizing unit 18. FIG. 5(*a*) shows one example of a screen display in this case. In the drawing, the symbol 30*a* represents a displayed screen on the display unit 7, and the APL represents the proposed action list. This drawing shows an example in which four options such as "go to rest room", "take meal", "take rest", and "supply oil" are displayed as the proposed action list APL, in a situation that "Ebina Service Area (SA)" is selected as the destination (place).

The next step S4 judges whether any one of the proposed actions are selected (YES) or not (NO) by means of the system controller 12, among the detailed conditions for the destination that are displayed in a list on the screen of the display unit 7 (proposed action list APL of FIG. 5(*a*)). This selection can be performed by the user operating the remote control transmitter (operating unit 2) and setting the cursor to the position of a desired "proposed action" on the screen. And if the judgment is YES, the process goes to step S5; and if NO, it goes to step S10.

Step S5 judges, by means of the system controller 12, whether the on-vehicle database (DB) (DVD-ROM 1*a*) contains the relevant map information including the guide point corresponding to the selected proposed action (YES) or not (NO). If "go to rest room" is selected from the proposed action list APL in FIG. 5(*a*), for example, the "guide point" here refers to "parking near rest room" (refer to FIG. 3). If the judgment is YES, process goes to step S6; and if NO, it goes to step S7.

Step S6 searches, by means of the system controller 12, the guide point (detailed location) corresponding to the selected proposed action by referring to the relevant map information stored in the map database (DVD-ROM 1*a*), and sets the searched guide point as the destination; and terminates this process ("end").

When the relevant map information does not exist in the on-vehicle database (DB), on the other hand, step S7 accesses, under the control of the system controller 12, an external information center retaining a map database (DB) through the communication unit 3, and searches for the relevant map information.

Figure 5B:
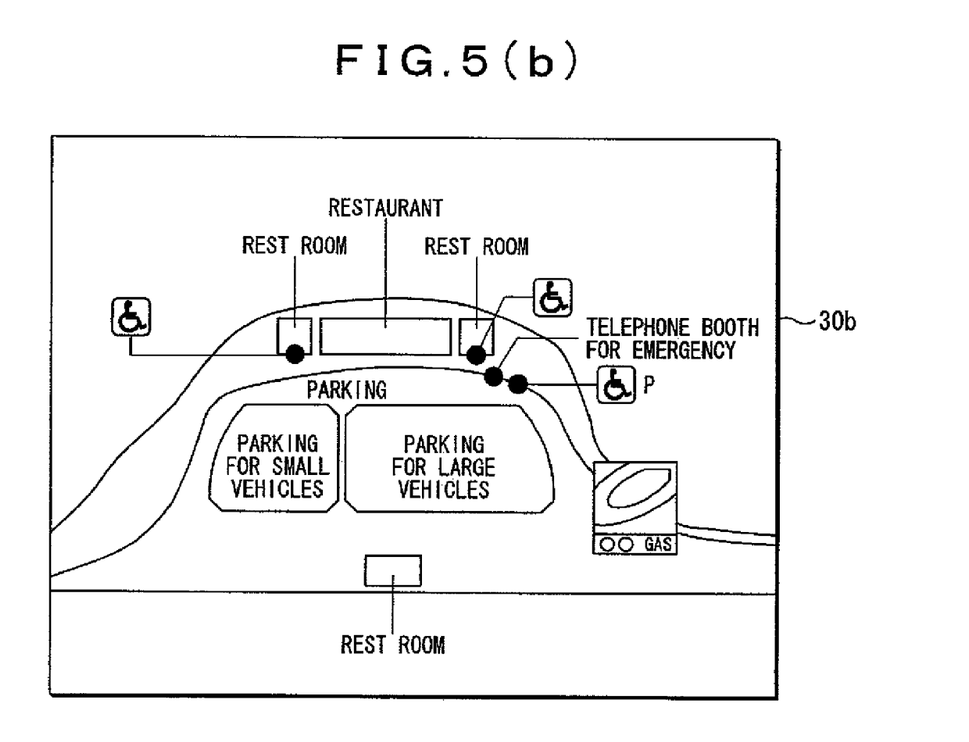

The next step S8 judges, by means of the system controller 12, whether the external database (DB) has the relevant map information (YES) or not (NO). If the judgment is YES, the process goes to step S6, and the above processes (searching for the guide point corresponding to the selected purposed action, and setting the destination) are performed. Here, the map information to be searched (map information obtained from the external database (DB)) is shown on a display screen 30*b*, as illustrated in FIG. 5(*b*). On the other hand, if the judgment is NO at step S8, the process goes to step S9.

The next step S9 displays, under the control of the system controller 12, a message notifying the user that the relevant map information, namely, map information including the guide point corresponding to the selected proposed action, does not exist ("cannot find the detailed information", for example) through the image synthesizing unit 18 on the screen of the display unit 7. Then, the process goes to step S10. As the manner of outputting the message, instead of displaying the message on the screen of the display unit 7, the speaker 8 may deliver the message in the form of an audio output through the audio output unit 19.

Step S10 searches, by means of the system controller 12 in the same manner as the process performed at step S6, the point (representative location) that represents the initially selected destination (place) by referring to the map information stored in the map database (DVD-ROM 1*a*), and sets the searched point as the destination. The processes of searching and setting the destination performed herein are the same as in conventional systems. Here, the process ends.

The processes following steps S6 and S10 are omitted, since they are not directly related to this invention. However, the navigation system of this invention performs the search for a guide route based on setting a destination or the like, and provides route guidance based on that, in the same manner as a conventional navigation system. One example of it will now be described.

When a destination (detailed location or representative location) is set at step S6 or S10, first the data of the destination are sent to the system controller 12. On the basis of the data of the set destination and the data of the current position (starting point) detected by the GPS receiver 4, the system controller 12 controls the DVD drive 1 to read out the map data of an extent covering the position of the vehicle to the destination from the DVD 1*a* to the buffer memory 11, and, referring to the map data read to the buffer memory 11, searches for an optimum guide route to the destination (a route such that the total distance or time required to travel to the destination is minimized) by means of the breadth-first search method or the like.

Next, the system controller 12 controls the image synthesizing unit 18 in a manner that the image of the searched guide route is superimposed on the map image displayed on the screen of the display unit 7. Here, the searched guide route is displayed in a manner distinguishable from other roads (changing the color or thickening the line or the like). Thereby, the user can easily recognize a guide route leading to the destination on the screen of the display unit 7.

Further, as the user obtains the guide route and operates the remote control transmitter (operating unit 2) to point to "route setting", the data of the guide route are stored in the guide route memory 16. Further, in case the user searched for plural guide routes to the destination in the route search, the searched guide routes are displayed with different colors on the screen of the display unit 7, and the data of the one guide route that the user selected among them are stored in the guide route memory 16. Thus, route setting is completed, and thereafter route guidance is performed, under the control of the system controller 12, so as to follow the guide route set in the guide route memory 16.

Thus, according to the process (FIG. 4) for setting a guide point corresponding to a proposed action at a destination, which is performed by the on-vehicle navigation system 20 (FIG. 1) of this embodiment, the following are performed: registering the proposed action information wherein plural proposed actions are listed (proposed action list) to be associated with each of the search places (FIG. 1 and FIG. 3) that are candidates for destinations and/or way points; extracting a proposed action list when a place of a destination or the like is selected, and displaying the proposed action list on the screen of the display unit 7 (FIG. 5(a)); when any one of the proposed actions is selected from the list, referring to the map information stored in the map database (DVD-ROM 1a) or the map information obtained from the external database to search for the guide point (detailed location at the place) corresponding to the proposed action, and setting the searched guide point as the destination.

In setting a destination, the proposed actions at the destination are organized in a list and are provided to the user through the screen, and the guide point at the place (destination) can be varied according to the proposed action selected by the user. Thereby, the system of this invention performs the setting of an optimum guide point corresponding to a user's proposed action and the route guide based on this setting.

In comparison with the conventional technique, this system increases the operations to select a detailed condition (proposed action) and a detailed location (guide point) corresponding to the proposed action of the user, before determining an initial guide route; however, the system securely sets the guide route to meet the user's purpose at the initial try.

In the above embodiment (FIG. 4), in correspondence with a proposed action at an initially selected destination (place), a guide point at the place can be varied; however, the initially selected place is not limited to the destination. In an example, the system may be made to select a way point only and search for a guide point corresponding to a proposed action at the place, to set the searched guide point as the way point, and to search for a guide route running through the place.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An on-vehicle navigation system comprising:
   a display means that provides information through a screen,
   an input means that inputs a destination or way point,
   a first storage means that stores map data,
   a second storage means that stores proposed action information in a list form, in which the proposed action information is pre-defined to correspond to places prepared as candidates for destinations or way points, and
   a control means connected operationally with the display means, input means, first storage means, and second storage means,
   wherein, when a desired destination or way point is input through the input means, the control means extracts the information on the proposed actions corresponding to the input destination or way point from the second storage means to display the corresponding proposed actions in a list form on the screen of the display means, and when any of the proposed actions is selected from the displayed list, the control means refers to the map data to search for a guide point corresponding to the selected action, and sets the searched guide point as the destination or the way point, wherein the guide point is a detailed location of the input destination or way point.

2. An on-vehicle navigation system according to claim 1, wherein the control means refers to the map data, searches for a guide route leading to the guide point set as the destination or the way point, and displays the searched guide route on the screen of the display means.

3. An on-vehicle navigation system according to claim 1, further comprising a communication means that communicates with an external establishment,
   wherein, when map information for the guide point corresponding to the selected proposed action is not contained in the map data, the control means searches for information on the guide point through the communication means.

4. An on-vehicle navigation system according to claim 3, wherein, when information on the guide point does not exist in the search result executed through the communication means, the control means displays a message to that effect on the screen of the display means.

5. An on-vehicle navigation system according to claim 3, further comprising an audio output means,
   wherein, when information on the guide point does not exist in the search result executed through the communication means, the audio output means delivers a message to that effect in an audio output form.

6. An on-vehicle navigation system according to claim 3, wherein, when information on the guide point does not exist in the search result executed through the communication means, the control means refers to the map data and sets a point representing the destination or the way point selected through the input means as the destination or the way point.

7. An on-vehicle navigation system according to claim 1, wherein, when a destination or a way point is selected through the input means, and when information on the proposed action at the selected place is not registered in the second storage means, the control means refers to the map data and sets a point representing the destination or the way point selected through the input means as the destination or the way point.

8. An on-vehicle navigation system according to claim 7, wherein the control means refers to the map data, searches for a guide route leading to the point representing the place set as the destination or the way point, and displays the searched guide route on the screen of the display means.

9. A route guide method in an on-vehicle navigation system including a function of searching for a guide route leading to a selected destination or a selected way point and displaying the searched guide route on a screen of a display means to guide the vehicle, comprising:
   registering proposed action information organized in a list form in a storage means, in which the proposed action information is pre-defined to correspond to places prepared as candidates for destinations or way points,
   when a desired destination or way point is input, extracting the information on the proposed action information corresponding to the input destination or way point from the storage means to display the proposed action information in a list form on the screen of the display means,
   when any of the proposed actions corresponding to the input destination or way point is selected from the displayed list, referring to a map database to search for a guide point corresponding to the selected proposed action, wherein the guide point is a detailed location of the input destination or way point, and
   setting the searched guide point as the destination or the way point.

10. A route guide method according to claim 9, wherein, when a guide point corresponding to the selected proposed action is searched, and when map information on the guide point is not contained in the map database, information on the guide point is searched externally through a communication means.

11. A route guide method according to claim 10, wherein, when information on the guide point does not exist in the search result executed through the communication means, a message to that effect is displayed on the screen of the display means.

12. A route guide method according to claim 10, wherein, when information on the guide point does not exist in the search result executed through the communication means, an audio output means delivers a message to that effect in an audio output form.

13. A route guide method according to claim 10, wherein, when information on the guide point does not exist in the search result executed through the communication means, a point representing the destination or the way point selected on the basis of the user input is set as the destination or the way point.

14. A route guide method according to claim 9, wherein, when a destination or a way point is selected on the basis of the user input, and when the proposed action information for the place is not registered in the storage means, a point representing the selected destination or the selected way point is set as the destination or the way point.

15. A computer-readable recording medium for an on-vehicle navigation system including a computer that controls a function of searching for a guide route leading to a selected destination or a selected way point and displaying the searched guide route on a screen of a display means to guide the vehicle, in which are recorded programs that control the computer to execute the following procedures of:
   when a destination or a way point is input, extracting proposed action information from a storage means, in which the proposed action information is pre-defined for places prepared as candidates for destinations or way points, the proposed action information for the selected place being displayed on the screen of the display means,
   when a proposed action is selected from the displayed proposed action information, searching for a guide point corresponding to the selected proposed action, wherein the guide point is a detailed location of the input destination or way point, and
   setting the searched guide point as the destination or the way point.

16. A computer-readable recording medium according to claim 15, in which is further recorded a program that controls the computer to execute the following procedure of:
   when the guide point corresponding to the selected proposed action is searched, and when map information on the guide point corresponding to the selected proposed action is not contained in a locally stored map database, searching for information on the guide point corresponding to the selected proposed action from an external source.

17. An on-vehicle navigation system comprising:
a display that provides information through a screen,
an input means that inputs a destination or way point,
a first storage means that stores map data,
a second storage means that stores proposed action information, in which proposed action information is pre-defined based on genres of places selectable as destinations or way points, and
a control means connected operationally with the display means, input means, first storage means, and second storage means,
wherein, when a destination or a way point is input through the input means, the control means determines the genre of the specified place, extracts the proposed action information based on the genre of the place from the second storage means to display the proposed action information on the screen of the display means, and when a proposed action is selected from the displayed information, the control means refers to the map data to search for a guide point corresponding to the selected proposed action, and sets the searched guide point as the destination or the waypoint, wherein the guide point is a detailed location of the input destination or way point.

* * * * *